(12) United States Patent
Trachier

(10) Patent No.: US 6,438,446 B1
(45) Date of Patent: Aug. 20, 2002

(54) MATERIAL DIRECTORY-SPINDLE SPEED AND FEED RATE CALCULATOR

(76) Inventor: Fredrick J. Trachier, 3500 Yacht Club Ct., Arlington, TX (US) 76016

( * ) Notice: Subject to any disclaimer, the term of this patent is extended or adjusted under 35 U.S.C. 154(b) by 0 days.

(21) Appl. No.: 09/350,884

(22) Filed: Jul. 12, 1999

Related U.S. Application Data

(60) Provisional application No. 60/092,685, filed on Jul. 13, 1998.

(51) Int. Cl.$^7$ ............................................. G06F 19/00
(52) U.S. Cl. ........................ 700/180; 700/83; 700/179; 700/170; 700/171; 700/32; 700/46; 702/145; 408/9; 408/11; 408/12; 83/311; 83/312
(58) Field of Search ................................ 700/151, 160, 700/168–170, 173, 175, 178, 180–181, 188; 702/145; 369/240; 83/311–312, 403.1, 494; 408/8–12

(56) References Cited

U.S. PATENT DOCUMENTS

| | | | |
|---|---|---|---|
| 2,942,781 A | | 6/1960 | Abatemarco ................. 700/173 |
| 3,976,861 A | * | 8/1976 | Edwards et al. ............. 318/517 |
| 4,346,444 A | * | 8/1982 | Schneider et al. ........... 700/173 |
| 4,400,781 A | * | 8/1983 | Hotta et al. .................. 700/164 |
| 4,513,381 A | * | 4/1985 | Houser, Jr. et al. .......... 700/168 |
| 4,540,318 A | * | 9/1985 | Hornung et al. ................ 408/9 |
| 4,547,847 A | * | 10/1985 | Olig et al. ...................... 700/52 |
| 4,636,961 A | * | 1/1987 | Bauer .......................... 700/168 |
| 4,698,773 A | | 10/1987 | Jeppsson ..................... 700/160 |
| 4,707,793 A | | 11/1987 | Anderson .................... 700/188 |
| 4,862,379 A | | 8/1989 | Fujimoto ..................... 700/169 |
| 4,887,221 A | | 12/1989 | Davis et al. ................. 700/181 |
| 5,107,435 A | * | 4/1992 | Yamada ....................... 700/180 |
| 5,136,903 A | | 8/1992 | Hibi ............................. 82/1.11 |
| 5,170,358 A | * | 12/1992 | Delio ........................... 700/177 |
| 5,914,881 A | | 6/1999 | Trachier ...................... 700/160 |

* cited by examiner

Primary Examiner—Thomas Black
Assistant Examiner—Crystal J Barnes
(74) Attorney, Agent, or Firm—James G. O'Boyle; Mitchell B. Wasson

(57) ABSTRACT

A programmable command module for inputting a surface foot rating parameter into a device for controlling the spindle speed of a cutting tool. Based upon the surface foot rating, the proper speed of the spindle is determined with respect to a particular cutting tool parameter, such as the tool's diameter. The spindle speed setting is transmitted to an AC inverter which in turn controls the operation of an AC motor for rotating the spindle at its proper speed. Alternatively, a second embodiment of the present invention would include a programmed memory provided with the surface foot rating of a plurality of materials. Once the type of material, the type of tool operation, as well as the diameter of the cutting tool is inputted into this embodiment, the proper RPM speed of the spindle would be determined. This speed would then either be manually inputted into the machine tool, or would automatically control the spindle speed of the machine based on the recommended machinability of the work piece based on its surface foot rating. In addition, once the recommended tip speed of the cutting tool has been determined, the second embodiment now can calculate the recommended linear feed rate of the cutting tool based on chip load per cutting tooth and the amount of cutting tips of the cutting tool, calculated in inches per minute.

4 Claims, 4 Drawing Sheets

MATERIAL DIRECTORY-SPINDLE SPEED AND FEED RATE CALCULATOR

CROSS-REFERENCE APPLICATION

The present application claims the benefit of provisional application 60/092,685 filed Jul. 13, 1998.

FIELD OF THE INVENTION

The present invention is directed to a device for determining the proper revolutions per minute (RPM) for cutting or milling a particular material.

BACKGROUND OF THE INVENTION

When conducting machining operations on a particular workpiece, it is important to determine the correct RPM of the cutting tool which is based upon surface foot rating of the material constituting the workpiece. It is well known that the surface speed of the material, calculated in a surface foot rating, has a definite relationship with respect to the diameter of the cutting tool and the RPM of the cutting machine. Various tables have been developed showing this relationship. Therefore, utilizing these tables for specific surface speed would convey information relating to the proper diameter of the cutting tool and the speed of rotation of the cutting tool. Once this information was determined, the operator of the machine would select the diameter of the cutting tool, insert it into the machine, then would manually set the proper RPM of the spindle to which the cutting tool is attached.

Furthermore, if the operator wishes to perform several successive operations on the workpiece utilizing tools of different diameters, the proper RPM must be calculated or read from the table for each of the tools. For example, if the operator wishes to drill a one-half inch diameter hole in a material, he must calculate the RPM based on the diameter of the cutter and the surface foot rating of the material to be machined. Subsequently, if the operator wishes to drill a one-inch diameter hole in the same material, the operator must change the RPM of the spindle, based upon the calculation of the surface feet per minute of the material to be machined. Not only would these calculations have to be performed, they must be retained by the operator so that he would not have to calculate the RPM of the spindle if the same operations were to be performed on more than one workpiece.

Most manual knee-type milling machines utilized at the present time employ two methods of changing the spindle speed (RPM). The first method would include a mechanical variable-speed drive in which the operator changes the RPM by a crank handle which, in turn, changes the belt position on a bellows-type pulley arrangement. A mechanical dial associated with the milling machine would display the particular spindle speed. Unfortunately, although the particular speed of the spindle would be displayed, the actual spindle speed could vary substantially, based upon the mechanics of the design.

The second method which is presently utilized for changing spindle speeds would employ a step pulley. Although this step pulley would provide a more accurate spindle speed, it is limited to a selection of only several discrete RPMs.

A number of prior art patents have issued relating in general to the problem of determining the proper operating parameters for a particular endeavor. For example, U.S. Pat. No. 2,942,781 issued to Abatemarco relates to calculating and analyzing devices which are adapted to utilize data obtained from standard tables to determine optimum operating conditions. In a machine tool such as a lathe or milling machine, the fundamental relationship between various parameters such as time, length of cut, feed rate, rotary speed of the work or cutter, the number of teeth on the cutter, the chip load per tooth per revolution as well as the relative surface speed of the cutter and work and the diameter of the cutter or work are known. Therefore, if one or more of these parameters are inputted into the standard data analyzer shown in the Abatemarco patent, parameters dependent upon those which were introduced into the analyzer can then be determined. However, the calculator device of the Abatemarco patent has no control over the actual speed of a milling machine spindle.

Furthermore, as stated in column 7 of the Abatemarco patent at line 47, "It is assumed, of course, that the person operating the analyzer will have access to the necessary books, tables or charts containing the information which is pertinent to his problem. He will need to know, for example, the recommended surface speeds and chip loads for specified machining operations performed upon various given materials under the different conditions that are likely to be encountered in practice. The available speeds and feed rates of standard machine tools usually are known or can easily be obtained. The local shop practice, insofar as it affects the parameters of the problem, also must be taken into consideration." The fact that look-up tables are required as recited at columns 8 and 9 of the Abatemarco patent.

Similarly, U.S. Pat. No. 4,707,793 issued to Anderson describes a method of determining the feed rate and cutting speed for cutting metal by inputting various parameters into a calculator. Any calculations produced by the Anderson calculator would have to be manually inputted into a particular machine.

As indicated by the Anderson patent, these initial parameters are obtained from reference manuals which state known recommended starting point machining recommendations. These recommended surface foot ratings and cutter tip chip loads based on the material being machined, and type of cutting tool being applied to machine the work piece, are monitored manually in order to determine maximum efficiency of the machining process. The basis of this optimum machining is related to the known horsepower of the machine spindle, the fixturing of the work piece, rigidity of setup, mechanical configuration of the attached cutting tool, and finish requirements of the completed work piece.

U.S. Pat. No. 5,136,903 issued to Hibi describes a method of automatically determining a machining range such as the best chucking point on a workpiece machine utilizing a CNC program. However, as was true with respect to the Anderson and Abatemarco patents, this patent does not deal with the peripheral speed of a rotating cutter used in a milling machine.

U.S. Pat. No. 4,698,773 issued to Jeppsson is directed to a system for adaptively limiting the feed rate of a milling machine's positioning axes during a milling operation. Strain gauges are employed on a numerically controlled milling machine which senses the load on the cutting tool. A signal is then sent to a device for automatically overriding the program feed rate to maintain a peak side load on the cutting tool. As was true with respect to the above-noted patents, the Jeppsson device does not control the speed of the spindle but only overrides the feed rate.

SUMMARY OF THE INVENTION

The disadvantages of the prior art are addressed by a first embodiment of the present invention which would remove all guess work and manual calculations from machining on the type of milling machines in which various workpieces are treated. (Although this invention will be applied to other operations, i.e. lathes, etc., for the present time, the milling machine is addressed here.) The operator would be only required to know the surface foot rating of the material to be machined. This parameter is entered into the programmable speed controller of the present invention which would display the correct spindle speed (RPM) for the diameter of the cutter the operator selects. For example, when the operator rotates an analog variable-speed dial, the displayed RPM increases or decreases, based upon the diameter of the cutting tool which is simultaneously displayed. Therefore, according to the present invention, once the surface foot rating is entered into the device and a cutting tool having a particular diameter is selected, the speed of the spindle would also be displayed.

The speed of the spindle for a selected cutting tool is then converted into a direct current (DC) value which is transmitted to an alternating current (AC) inverter. The DC value of the particular spindle speed is then converted into an AC motor which rotates the spindle. This spindle speed is directly related to the AC output of the AC inverter which in turn operates the AC motor at the same value to produce a very accurate spindle speed. This embodiment is described in U.S. Pat. No. 5,914,881, granted to the applicant of the present invention.

A second embodiment of the present invention would include an extended read-only memory (ROM), a programmable read-only memory (PROM), and erasable programmable read-only memory (EPROM) or similar memory device which would include the surface foot rating for a number of materials. This embodiment could take the form of a portable, compact computing device as a stand alone device, or in combination with the above-described first embodiment. This second embodiment would calculate the required RPM for a machine tool based upon the material and the type of tool cutter being used. This device allows the user to scroll through a list of pre-programmed materials and pre-programmed machine tools. Upon selecting the tool diameter, this second embodiment will display to the operator via a display device such as a liquid crystal display (LCD) the required RPM to operate the machine. At this point, the operator could manually set the machine to the proper RPM or, alternatively, this second embodiment would be in direct communication with the particular machine which would automatically set the tool to the proper RPM.

Further features, advantages, and benefits of the present invention will be found in and perceived from the ensuing detailed description of the preferred embodiments of the present invention. The drawing which accompanies the disclosure illustrates the preferred embodiments in the best mode contemplated at this time for carrying out the invention.

DETAILED DESCRIPTION OF THE INVENTION

Figure 1:
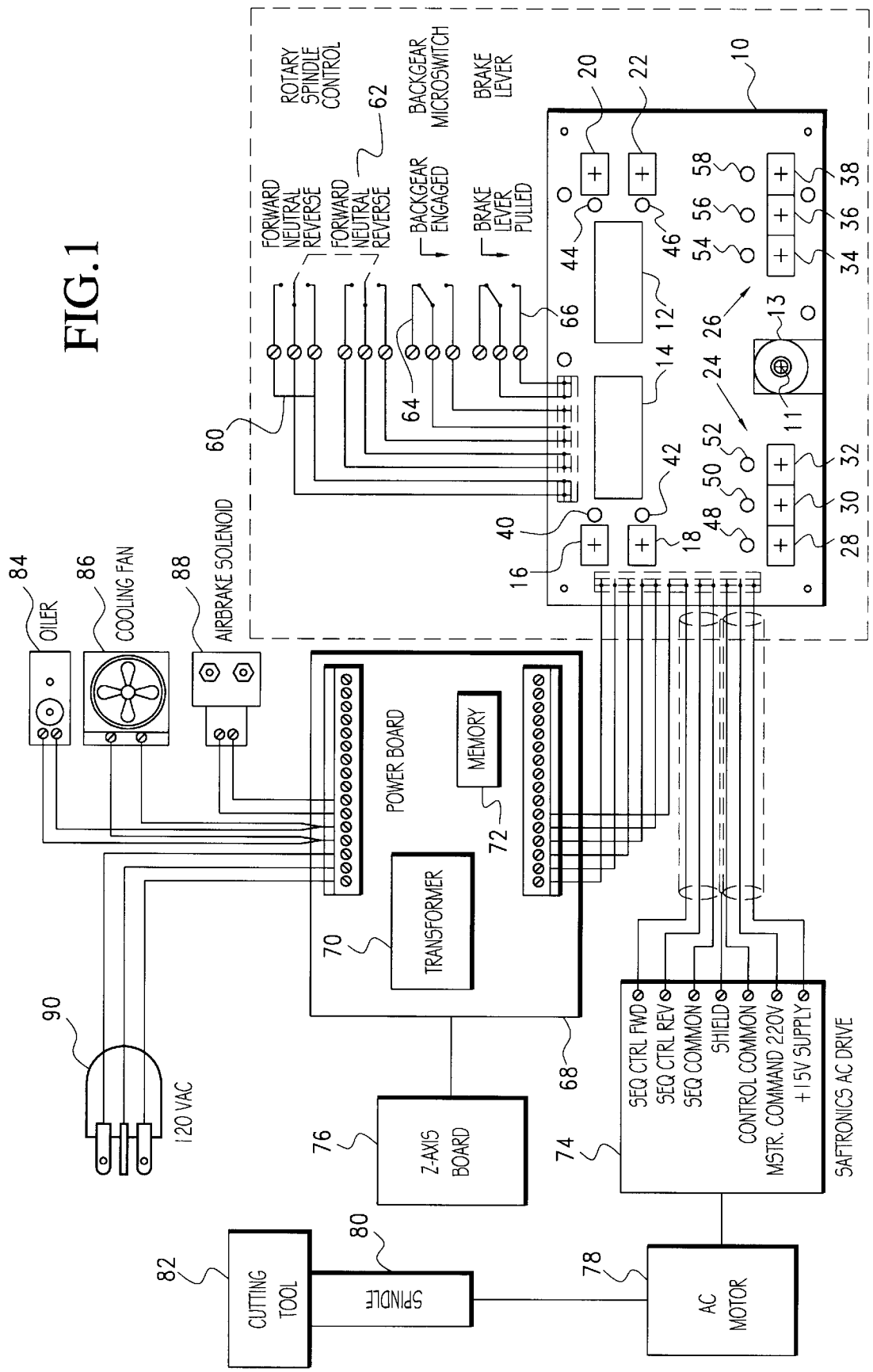
FIG. 1 is a schematic drawing of the programmable speed controller of the present invention.

The present invention as illustrated with respect to FIG. 1 includes a programmable command module provided with a display and input device 10, a power board 68, and an AC inverter 74. The inverter 74 controls the operation of an AC motor 78 which is provided with a rotating spindle 80 having a cutting tool 82 attached thereto. An oiler 84, a cooling fan 86 and an airbrake solenoid 88 are also provided.

The programmable speed controller particularly in conjunction with the display and input means 10 and the power board 68 is designed to store any division of an analog voltage into memory. This analog voltage can either be AC or DC. The present invention is also designed to store an unlimited number of analog voltage divisions and to recall these voltages initiating one or more switches including an infinitely variable dial. The infinitely variable switch, such as dial 13 is used to regulate the divided analog voltage which is displayed on displays 12 and 14. These displays could be a liquid crystal display or any other type of display known in the art. Once a 5 particular parameter is determined and displayed in either of the displays 12 or 14, it can be used to operate a particular device, such as a spindle having a cutting device thereon. Additionally, these and other parameters can be introduced into the memory for use at a later time. Although the type of external device which 10 is attached to the input and display device 12 as well as the power board 68 is virtually unlimited, the present invention shall now be described with respect to an AC inverter 74. One such AC inverter is manufactured by Saftronics Inc. Other AC inverters are manufactured by General Electric, Dayton as well as many other manufacturers. Most AC motors operate at 60 hertz and, for ease of discussion, we will assume that 1 hertz equals 30 RPM. Therefore, 60 hertz would equal 1800 RPM. Furthermore, for ease of explanation, we will assume that an AC inverter would operate in the range of 0 to 180 hertz.

For example, if an AC inverter is set at 90 hertz×30 it would equal a maximum of 2700 RPM on an attached AC motor.

If that same AC inverter or a different AC inverter would operate at 180 hertz, the maximum speed would be 5400 RPM (180 hertz×30) on the attached AC motor. Regardless of the hertz setting the user sets, an AC inverter would normally accept a 0–10 DC volt signal which is divided equally within the hertz range selected. For instance, in the example given above in which the maximum speed is 2700 RPM, any voltage between 0–10 DC would produce a given RPM to the attached AC motor.

Using an example in the metal working industry, materials to be machined have been given an industry standard of machinability in a surface foot rating. These ratings relate to the peripheral speed of a rotating tool, based upon the diameter of the cutting tool. For example, as taken from the second edition of The Machining Data Handbook by the Machinability Data Center, Metcut Research Associates Inc. of Cincinnati, Ohio, the surface route rating of 6061-T6 aluminum alloy Wrought is between 800 and 1200 surface foot per minute. Additionally, 303 Austenitic stainless steel would have a surface foot rating of 130 to 160 surface foot per minute. Since the circumference in feet multiplied by the surface foot rating equals the RPM of the spindle, mathematical computations would indicate that a one foot diameter cutter having a surface foot rating of 100 should be cut by a spindle rotating at 31.4 RPM.

Because most materials have a recommended machining surface foot rating, the operator must calculate the correct RPM based upon a surface foot rating and the diameter of the cutter size selected. This calculation would enable the operator to determine the correct RPM setting for the machine being utilized.

Normal accepted machining practice is to select a material surface foot rating, and then to calculate the diameter of the cutting tool into this surface foot, which would produce a recommended speed for the cutter diameter. The operator would then select the closest speed available on the machine which is used. Since most users do not have the knowledge or do not take the time to calculate this important function of machining, excessive tool wear and tool breakage occurs, which is one of the most expensive costs related to machining.

The present invention is designed to be connected to a cutting tool through the AC inverter as an after market item or can be initially incorporated into the machining tool. In either instance, the present invention is programmed utilizing a solid state memory 72 provided on the power board 68 to determine the proper spindle speed (RPM) and consequently the proper diameter size of the cutting tool based upon a surface foot rating which would be manually introduced to the machine by the operator. This programming can be accomplished when the present invention is built as well as at a later time. When the programming has been accomplished, inputting of the surface foot rating would automatically result in the correct determination of both the spindle speed based on the cutting tool diameter selected.

As shown in FIG. 1, the display and input device 10 includes various switches and displays allowing the operator to utilize the present invention. This display and input device can be provided directly upon the milling machine or in a self-contained unit directly attached to the milling machine. The control and display unit would include two displays 12 and 14. These displays would display various parameters relating to the cutter speed and the cutter diameter. It is noted that more than two displays can be included if additional parameters need be monitored. A power switch 16 is provided for applying DC power to the present invention. A 120 volt AC plug 90 is connected to the power board 68 for attachment to a standard wall outlet. A standard transformer 70 is included in the power board for converting the AC voltage to DC voltage which can then be utilized by the controller device of the present invention. Minimum and maximum RPM levels can be introduced into the controller when the controller is manufactured or by the individual user. If these RPM levels have not been set or have been lost, the controller can enter set RPM limits. If the spindle 80 is controlled by an air brake (not shown), a brake button 18 would control the actuation of this air brake through an air brake solenoid 88 connected to the power board 68. When the button is ON, the air brake or brakes are released when spindle controls 60, 62 are set to either forward or reverse and applied automatically when the brake lever is hit. When the brake button is in the OFF setting, the brakes are not applied when a brake lever 66 is engaged. The power board 68 also includes a processing network for determining the proper cutting tool RPM based upon the parameter entered into the device as well as converting an output into a percentage of the range of the invertor.

The present invention can operate in either the "drill press", "manual" or "automatic" modes. When the controller of the present invention is first initiated, the controller would be in the "drill press" mode. This is the simplest operating mode. No calculations for surface feed/minute are made or displayed. The spindle RPM is displayed as a variable rotating dial 13 is turned. In this mode, a particular RPM value is displayed in either of the displays 12 or 14. The particular RPM value which is selected would automatically divide a DC voltage, such as 10 volts into the appropriate voltage which would be applied to the AC inverter 74, which would then operate the AC motor 78 and the spindle 80 at the proper rotation speed.

The present invention can also operate in the "manual" mode. In operation, when manual switch 20 is depressed, or a light emitting diode (LED) 44 would blink and one of the displays, such as 12, would prompt the user to enter a surface foot rating. Rotating dial 13 would allow entry of the proper surface foot rating by rotating the dial 13 in either a clockwise or counterclockwise direction which would increase or decrease the reading in display 12. When the proper surface foot is displayed, the manual switch 20 would be depressed and held for a predetermined amount of time. At this point, the display 14 would display a particular RPM value and display 12 would display a particular tool size diameter. At this point, when the operator would rotate the dial 13 in either a clockwise or counterclock-wise direction, the RPM value shown in display 14 and the tool size shown in display 12 would increase or decrease. Therefore, if the user would require a one inch diameter cutting tool, the user would rotate the dial 13 for this tool size shown in display 12. At that point, the proper spindle speed associated with this tool size and the surface foot rating would be illuminated in display 14. The operator would then only need to initiate the AC motor 78 which would then rotate the spindle 80 having a cutting tool 82 thereon at the proper speed based also upon the influence of the AC inverter 74. With the programmable command module of the present invention, the operator has the ability to select any diameter of cutting tool by rotating the dial 13 and the AC motor 78 will always seek the correct RPM based upon the programmed surface foot.

The present invention can also operate in the "automatic" mode by depressing the automatic switch 22. At this point, LED 46 would blink and the display 14 would ask for a surface foot entry. The operator would then rotate the dial 13 to display the desired surface foot reading in the display 12. The operator would then depress and hold the automatic switch 22 for a predetermined amount of time to store the surface foot reading in memory. The automatic operation would allow one or more tool settings to be automatically included in the command module's memory. These memory functions are programmed utilizing two input banks 24, 26, including the six memory buttons 28, 30, 32, 34, 36 and 38 shown in FIG. 1. Obviously, more or less tool settings can be utilized. Each of the memory buttons have LEDs 48, 50, 52, 54, 56 and 58 associated with them. At this point, the operator would press one of the memory switches and its respective LED would then begin to blink. The operator would then rotate dial 13 to display the desired tool size in display 12. By depressing and holding a memory switch, the tool size would be inputted into the memory 72. This procedure can be done for one or more tool sizes. After all of the tool sizes have been properly entered into the controller of the present invention, the operator would depress one of the memory buttons 28, 30, 32, 34, 36 or 38 which would display the programmed tool size in display window 12 as well as the appropriate RPM reading in display 14. At this point, the operator would attach the selected tool 82 to the spindle 80 which would rotate at the proper speed based upon the tool size and the surface foot rating.

It is noted that the present invention would allow operation of the spindle in the backgear mode. A backgear microswitch 64 is associated with the present invention and when this switch is selected, the spindle speed would be reduced at a 10:1 ratio. LEDs 40, 42, 44 and 46 are associated with the power switch 16, the brake switch 18, the manual switch 20 and the automatic switch 22 respectively. These lights would be utilized to indicate whether either of these switches are engaged or, if LED switches 44 and 46 are flashing, various settings can 10 be entered into the controller. Information which has been entered into the memory of the present invention can be checked to insure the accuracy of this information. For example, if the surface foot rating is to be checked, the automatic button 44 is depressed until the surface foot rating is displayed. Short taps on each respective preset button 28, 30, 32, 34, 36 or 38 will recall each loaded tool and the surface foot rating for that tool. Similarly, if the automatic button 22 is depressed until the RPM and tool size are displayed in displays 12 and 14, short taps on the proper preset buttons will recall the loaded tool and spindle speed for that location.

Maximum and minimum RPM settings are maintained in the non-volatile memory of the controller board of the present invention. When the controller is first turned ON, it would check the integrity of this information. If a problem is detected, the controller would automatically enter the set RPM limit mode. Maximum and minimum RPM values must then be set before the controller would operate. In this situation, the rotary spindle switches 60 and 62 must be in neutral and the brake lever 66 must be free. The brake control button 18 would then be depressed while the power button 16 is depressed. The display will then show 0000 and LED 44 associated with the manual control 20 would flash indicating that you have entered the special set up mode. At this point, the knob 13 is rotated until the desired maximum RPM is shown in one of the displays 12 or 14. The maximum RPM setting for backgear is automatically entered as 1/10th of the displayed RPM. The manual button 20 is then pressed to lock in this new maximum RPM. The LED 46 associated with the automatic button 22 would now flash and the display would show 0000. Knob 13 is then rotated to enter the desired minimum RPM which is also displayed in one of the displays 12 or 14. The automatic button 22 is pressed to lock in this setting.

As was true with respect to the maximum RPM setting, the minimum backgear setting is automatically set at 1/10th of the displayed RPM.

During the machining or cutting process, the distance between the cutting tool and the workpiece can be displayed on one of the displays 12 or 14. A Z-axis daughter board 76 is attached to the power board 68 are the movement of the spindle toward the workpiece will be sensed and transmitted between the cutting device, the power board 68 and the display unit. The display would show the distance between the workpiece and the cutting tool. As the distance between the cutting tool and workpiece decreases, the value in one of the displays 12 and 14 would also decrease until it reaches a zero point. Once this zero is passed, the value shown on the display would increase, showing the depth of the feed. The display is enabled by pushing a button 11 provided within the rotary dial 13.

As illustrated with respect to FIGS. 2–7, a second embodiment of the present invention is directed to a hand held compact computing spindle speed calculator to be used in conjunction with machine tool operations. This calculator will calculate the required RPM and feed rate for a machine tool based upon the material and type of tool cutter being used. The device allows the user to scroll through a list of preprogrammed materials and preprogrammed machine tools. This calculator can be used with lathes, milling machines, boring machines, and virtually any type of CNC machines, but is not limited to these machines. This calculator can be applied to any machines that cut, drill, ream, tap and bore, but is not limited to these tool operations. Although the exact dimensions of the hand-held calculator are not crucial to the operation of the present invention, this calculator can exhibit a width of 3¼ inches and a length of 5⅜ inches.

Once the proper RPM has been determined by entering the material to be cut, the type of tool operation as well as the diameter of the cutting tool, a display such as a liquid crystal display (LCD) would indicate the proper RPM. At this point, the machine operator would then manually enter the value of this RPM into the machine which would run a particular tool at this speed. Alternatively, the invention according to this second embodiment has an advanced feature that allows it to calculate recommended feed rate and communicate to a machine equipped with the first embodiment of the present invention or can directly communicate with the machine without the use of the first embodiment of the present invention. A bi-directional interface would allow this second embodiment calculator to provide speed information to the machine tool. This would allow the machine tool to operate at the correct RPM for optimal tool efficiency and life expectancy.

This bi-directional interface can be one of several types and is not limited to the following protocols, such as an RS-232, and RS-485, universal serial bus (USB), or serial peripheral interface (SPI). The interface module installed in the second embodiment of the present invention would match interface of the machine tool it would be controlling. The bi-directional interface protocol consists of commands to instruct the controller of the desired RPM, material type, tool type, and tool diameter.

To better understand the operation of the present invention as well as to understand the problems encountered by a machine operator, the following information is included in the second edition of the machining data handbook showing the recommended surface foot rating of the alloy steel 4130 for various machining operations.

| Material 4130 | | |
| --- | --- | --- |
| Operation | Type of Cutting Tool | Recommended Surface Foot |
| Drilling | High Speed Steel | 65 |
| End Milling | High Speed Steel | 12 |
| Counter Boring | High Speed Steel | 75 |
| Tapping | High Speed Steel | 45 |
| Reaming | High Speed Steel | 120 |
| Fly Cutting | Carbide | 410 |
| Lathe Turning | Carbide | 200 |

Keeping track of this information, therefore, can be difficult, especially when there is such a wide variety of materials to be machined. With approximately 40 generic materials being used in manufacturing, there could be as many as 240 surface foot ratings to remember. However, this information is really only half of the information needed. A surface foot rating must also be calculated into an RPM. When the proper RPM has been determined, then the correct feed rate based upon a chip load per cutting tool tip can be calculated.

If a machine operator would wish to use alloy steel 4130 in a drilling operation, the recommended surface foot rating would be 65. Therefore, if a 3 inch cutter would be employed, the circumference of this cutter would be determined by multiplying 3 inches by pi, equaling a circumference of 9.4248 inches. Dividing this number into 12 inches (1 surface foot) would indicate that 1.2732 rotations of the cutter would be equal to 1 surface foot. Since the recommended surface foot rating of the 4140 material in a drilling operation using high speed steel is 65, then the proper speed would be determined by multiplying 1.2732 rotations by 65 surface feet equaling 83 RPM.

After the recommended spindle speed has been calculated, the machine operator can calculate the recommended feed rate of the cutter based on recommended chip load per tooth. Recommended feed rate, 0.003 of an inch per cutting tooth per 1 revolution. Example: RPM has been established as 83, recommended feed rate per tooth is 0.003 for a cutting tool having 10 teeth. Therefore, 0.003×10 teeth=0.030×83 RPM=1.49 inches per minute. This is the recommended linear movement of the cutting tool.

The use of the proper speed is important, since improper application of spindle speeds would shorten tool life, increase tool breakage as well as decrease productivity. Using the appropriate manuals and calculations would take time. It is important to note that most operators either do not own or have access to these manuals in their working environment. Therefore, they often use guess work, which contributes to the above mentioned tool breakage and decreased productivity. Knowing the proper surface foot rating still requires constant calculation for each diameter tool being used. Therefore, the second embodiment of the present invention directed to a material directory/spindle speed/feed rate calculator would store and recall most of the commonly used materials to be machined. It stores and recalls the surface foot rating for different operations of the stored materials. It also calculates the proper RPM of the spindle for the cutter or part diameter based upon the surface foot rating stored and feed rate based on the number of cutting flutes.

As shown in FIGS. 2–6, when a machine operator wishes to use the calculator 100 to determine the proper speed for a particular operation using a particular material, the machine operator would depress the power button 116 activating a battery stored therein. This operation would then illuminate a liquid crystal or other display 101. The user would then depress buttons 118, 120 thereby allowing the operator to scroll through the memory of stored materials which would generally be stored in an alpha-numeric sequence. At present, the present invention stores 45 of the most popular materials covering approximately 75% of the most common metals used in general machining. However, it can be appreciated that the number of materials stored and the memory of the present invention can be increased or decreased.

Once the proper material has been selected, the name of this material will continue to be displayed in the display 101 as shown at position 102. At this point, the user would press buttons 122, 124 to scroll through various machine operations (drill, mill, tap, etc.) as shown at position 104 of display 101. The recommended surface foot per minute (SFM) will be displayed at position 110 of display 101. The recommended RPM shown at 103 based on the machine operation and surface foot displayed at positions 104 and 110 respectively will default a diameter of the tool shown at position 106.

If the tool diameter shown in position 106 is not the desired diameter of the cutting tool to be used, the operator would then depress buttons 126, 128 to scroll through various diameters until the diameter is displayed. As can be appreciated, as the value of tool diameter displayed at 106 changes, the recommended RPM will be simultaneously displayed at position 103.

The material directory/spindle speed/feed rate calculator as described with respect to the second embodiment of the present invention is a hand-held device 100 containing an embedded micro-controller and electronic circuitry used to respond to an operator selecting functions on a memory keypad or other type of information entering device. The micro-controller contains software algorithms that allow the operator to scroll through a list of pre-programed materials and machine tools. The operator uses the keypad to select the tool diameter to determine the recommended spindle speed. After spindle speed has been determined, the operator will depress "PAGE" button at position 114. This calculates the correct linear feed rate of the cutting tool based on the recommended cutting chip load per tooth, which is displayed at position 104 of FIG. 2. The numeric value displayed in this position indicates chip load per tooth in 0.001 increments. This value is now entered by again depressing "PAGE" button 114 which takes the operator to FIG. 3. The operator depresses buttons 118, 120 until the chip load value is displayed at position 102. The operator now depresses buttons 122, 124 of FIG. 3 until the number of cutting flutes of the cutter to be used is displayed in position 104. By confirming the correct RPM in position 103 of FIG. 3, previously calculated in FIG. 2, the recommended linear feed rate will be displayed in inches per minute at position 106 in FIG. 3. If, for some reason, operator wishes to change the RPM, the linear feed rate at position 106 in FIG. 3 will change accordingly, as long as chip load at position 102 and the flutes at position 104 remain the same. The information on the material type for each different tool is stored in the micro-controller. The LCD display would display the material, tool type, tool diameter, and the recommended spindle speed in RPM's as well as recommended feed rate based on RPM and cutter chip load per tooth.

Figure 2:
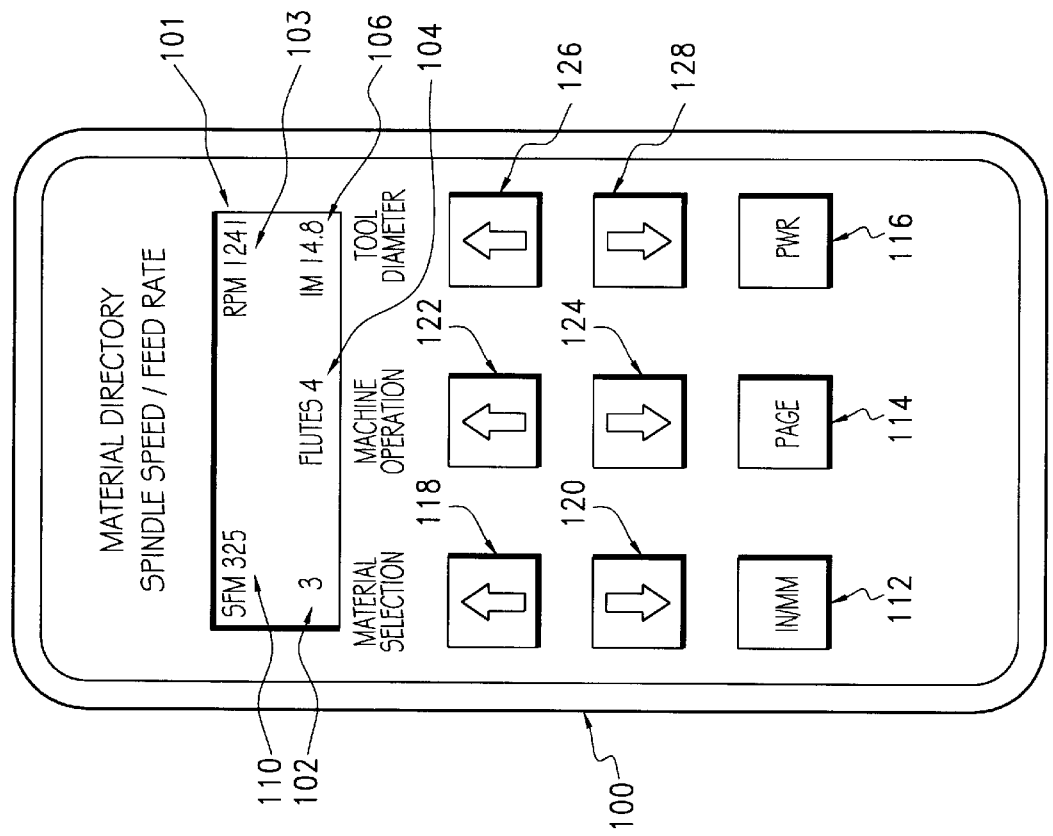
FIG. 2 is a top view of the calculator according to the second embodiment of the present invention showing an obtained RPM.
Figure 3:
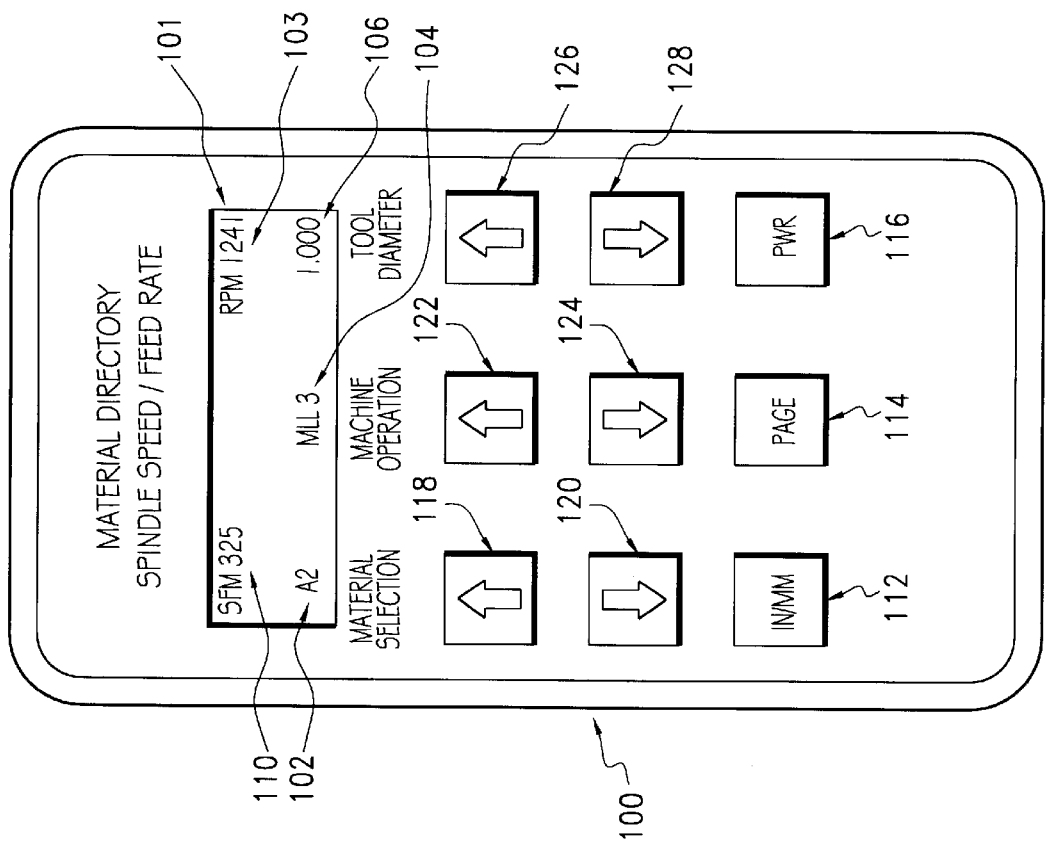
FIG. 3 is a top view of the calculator according to the second embodiment of the present invention obtaining a cutter feed rate.
Figure 5:
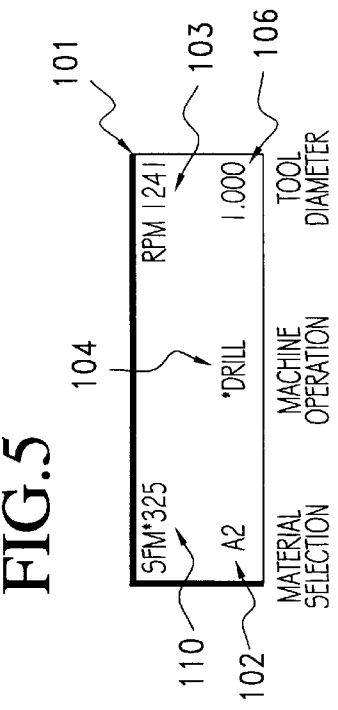
FIGS. 4, 5 and 6 show various displays of the calculator illustrated in FIG. 2.
Figure 4:
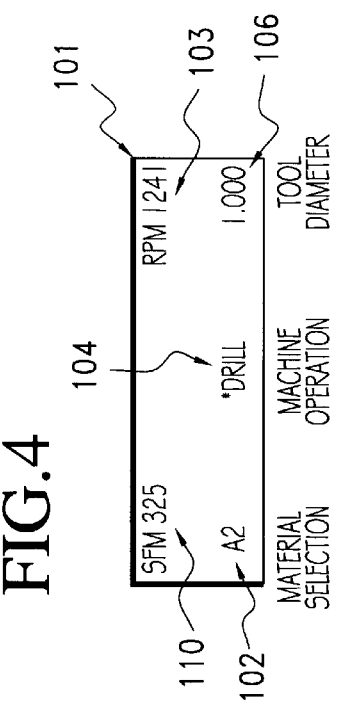
Figure 6:
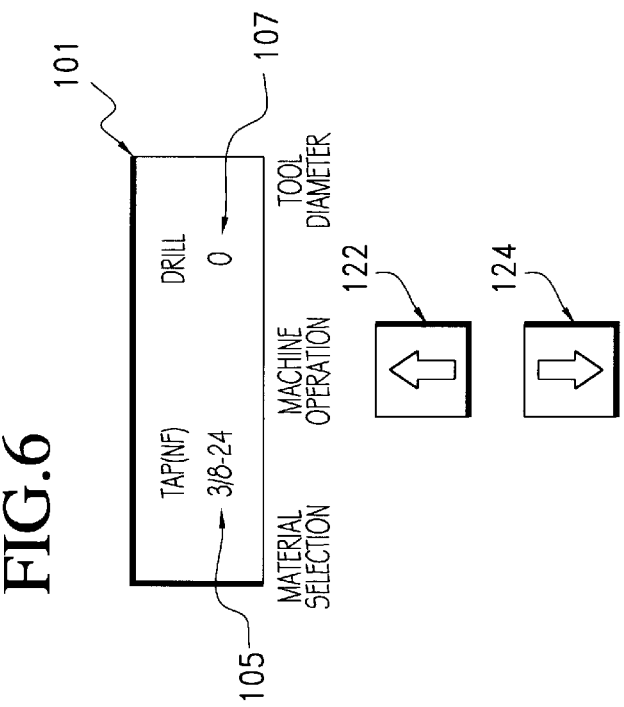

FIGS. 4, 5 and 6 illustrate various modifications of the display 101 shown in FIGS. 2 and 3. For example, the asterisks shown next to position 104 in FIG. 4 denotes the use of heat treated materials in the operation shown in that position. Furthermore, the asterisks included in position 110 of FIG. 5 indicate the use of a carbide cutting tool. The inclusion of no asterisk in position 110 as shown in FIGS. 2, 3 and 4 denote the use of a high speed steel cutting tool. It is also noted that if an asterisk is displayed at position 104 and no asterisk is displayed at position 110, then all computations are made using a cobalt cutting tool.

FIG. 6 illustrates a situation in which toggling the button 112 (see FIGS. 2 and 3) would display recommended drill for tapping, national coarse/national fine shown in position 105, metric coarse/metric fine threads shown in position 107.

Once all of the calculations are determined, the calculations would be connected to the tool in the manner shown in the embodiment of FIG. 1 to rotate the spindle at the proper RPM as well as to give the operator the recommended linear feed rate.

Figure 7:
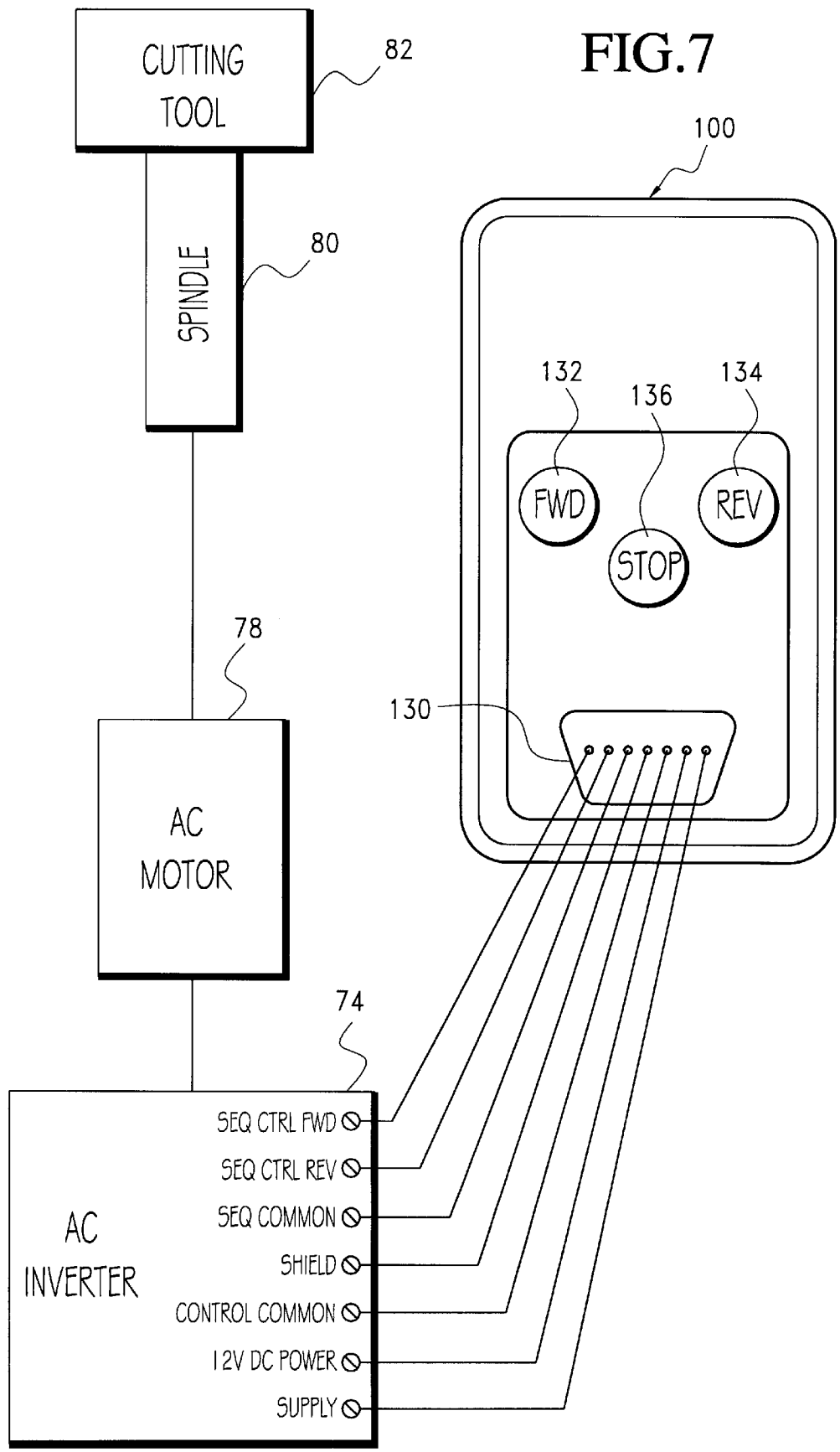
FIG. 7 is a partial schematic drawing showing the calculator of the present invention connected to a programmable speed controller.

FIG. 7 illustrates the calculator 100 according to the second embodiment of the present invention connected to the AC inverter 74 in a manner similar to which is shown in FIG. 1. It is noted that although FIG. 7 does not show the calculator 100 specifically connected to the power board 68, it is noted that this calculator 100 could be connected to the power board. As shown in FIG. 7, connections 130 are made from the back of the calculator 100 to their respective positions on the AC converter 74. A forward button 132, a reverse button 134 as well as a stop button 136 are all provided on the back of the calculator 100. The calculator 100 accepts a power source from the AC inverter 74 and communication is achieved by an RS-232 analog signal. However, it is noted that the present invention is not limited to only this form of communication.

All of the computations are normally achieved utilizing the calculator 100. The operator would first select the material and machine operation as described hereinabove. The operator, by depressing either the forward button 132 or the reverse button 134 would activate the AC inverter 74 which in turn activates the AC motor 78 to operate the spindle 80 with the attached cutting tool 82 at the recommended peripheral cutting speed determined by the calculator 100.

Having now described the invention in detail in accordance with the requirements of the Patent Statutes, those skilled in the art would have no difficulty in making changes and modifications in the individual parts or the relative assembly in order to meet specific requirements or conditions. Such changes and modifications may be made without departing from the scope and spirit of the invention, as set forth in the following claims.

What is claimed is:

1. A calculator for determining the proper rotational speed of a spindle used to rotate a non-numerically controlled, floor supported cutting tool for working a workpiece, comprising:

a microprocessor provided within the calculator with a memory containing the surface foot rating of a plurality of workpiece materials as well as relationships between said surface foot ratings of the workpiece and the diameter of the non-numerically controlled floor supported cutting tool with respect to the surface foot rating of the workpiece and the RPM of the spindle;

a first input device provided on the exterior surface of the calculator for scrolling through a plurality of material selections of the workpiece;

a second input device provided on the exterior surface of the calculator for scrolling through a plurality of machine operations for working the workpiece;

a third input device provided on the exterior surface of the calculator for scrolling through a plurality of tools for working the workpiece; and a display provided on the exterior of the calculator for displaying a plurality of outputs generated by said microprocessor and said first input device, said second input device and said third input device, said display displaying the surface foot rating of a selected workpiece, a particular operation to be performed on the workpiece, the proper rotational speed of the spindle based on the diameter of the selected tool to perform the operation on the workpiece.

2. The calculator in accordance with claim 1 wherein the calculator includes a fourth input device on the exterior of the calculator for instructing said microprocessor to calculate and display the feed rate of the non-manually controlled floor supported cutting tool.

3. A machine for working a workpiece with a non-numerically controlled floor supported rotating cutting tool comprising:

a spindle connected to the non-numerically controlled floor supported cutting tool;

a calculator provided with a microprocessor with a memory containing the surface foot rating of a plurality of workpiece materials as well as relationships between said surface foot ratings of the workpiece and the diameter of the non-numerically controlled floor supported cutting tool with respect to the surface foot rating of the workpiece and the RPM of the spindle;

a first input device provided on the exterior surface of the calculator for scrolling through a plurality of material selections of the workpiece;

a second input device provided on the exterior surface of the calculator for scrolling through a plurality of machine operations for working the workpiece;

a third input device provided on the exterior surface of the calculator for scrolling through a plurality of tools for working the workpiece;

a display provided on the exterior of the calculator for displaying a plurality of outputs generated by said microprocessor and said first input device, said second input device and said third input device, said display displaying the surface foot rating of a selected workpiece, a particular operation to be performed on the workpiece, the proper rotational speed of the spindle based on the diameter of the selected tool to perform the operation on the workpiece;

conversion means provided in said microprocessor for converting the RPM of the spindle into a specific DC voltage value within a range of DC voltage values;

an inverter connected to said microprocessor for inverting said specific DC voltage to produce a specific AC voltage;

an AC motor connected to said inverter at said spindle; and wherein said spindle rotates at the specific RPM of the non-numerically controlled floor supported cutting tool calculated by said microprocessor based upon the relationships between the surface foot rating, the tool diameter and particular machine operations.

4. The machine in accordance with claim 3 including a fourth input device provided on the exterior of said calculator for instructing said microprocessor to calculate and display the feed rate of the non-numerically controlled floor supported cutting tool.

* * * * *